United States Patent Office 2,919,273
Patented Dec. 29, 1959

2,919,273

PROCESS FOR THE THERMAL REARRANGEMENT OF SALTS OF CYCLIC CARBOXYLIC ACIDS

Hartwig Schütt, Hagen, Westphalia, Germany, assignor to Henkel & Cie. G.m.b.H., Dusseldorf-Holthausen, Germany, a corporation of Germany No Drawing. Application January 31, 1957
Serial No. 637,361

Claims priority, application Germany March 21, 1956

9 Claims. (Cl. 260—250)

This invention relates to a process for producing cyclic carboxylic acids by rearranging the relative position of carboxyl groups on an aromatic or heterocyclic nucleus by heating alkali metal salts of the aromatic or heterocyclic carboxylic acids to be rearranged in an oxygen-free inert atmosphere at temperatures above 340° C. and below the decomposition temperature of the starting materials and reaction products until a substantial portion of the alkali carboxyl groups have been caused to change their relative position on the cyclic nucleus. It more particularly relates to such a process wherein a catalyst is used which comprises a complex alkali metal halide salt of a catalytically active bivalent metal, such as cadmium, lead or zinc.

The conversion of dipotassium salts of o-phthalic acid at elevated temperatures into the corresponding salts of terephthalic acid is known to the art. Variations of this method have been described in several earlier patents which were confined to the processing of other carboxylic acid salts, which might contain other cations, particularly sodium, as well as other anions, e.g., anions of other aromatic or heterocyclic carboxylic acids. In every case the carboxyl group is directly attached to the aromatic or heterocyclic ring system. The reaction may be conducted in the presence of metal catalysts and/or alkali carbonates or alkali halides as diluents. In this process the yield is generally improved by operating under the pressure of an inert gas, especially carbon dioxide.

It is an object of this invention to produce rearranged cyclic carboxylic acids in increased yield.

It is a further object of this invention to prepare a catalyst mixture for a cyclic dicarboxylic acid rearrangement process which will give increased yields of the desired reaction products.

Another object is a process to obtain increased yields of rearranged cyclic carboxylic acids while operatin under reduced pressures.

These and other objects will appear as this description proceeds.

I have now found that the reaction is catalyzed especially advantageously by means of salts of the general formula $Alk_2(MeX_2Y_2)$ or $Alk(MeX_3)$. In the above formulas Alk is an alkali metal cation, especially the cations of sodium or potassium, Me is a bivalent catalytically effective metal, especially cadmium, zinc or lead, X is a halogen ion, especially a fluorine ion, and Y is a halogen ion, it being possible for two Y halogen ions to be replaced by the $CO_3$ ion. The catalyst is used in amounts of at least 0.5% of catalytically effective metal, and preferably in amounts of 1–10% based on the total reaction mixture. However, substantially larger quantities of catalyst may be employed, even to the point where the amount of catalytically effective metal will be equivalent to the number of carboxyl groups contained in the reaction mixture, i.e., that two carboxyl groups are present in the reaction mixture per metal atom.

The composition of the catalyst to be used has been set forth above as a complex salt formula. This is not necessarily the actual structure of the catalyst compound. It is quite possible that it is not a complex salt, but a double salt or mixed crystal with which I am concerned. In any event, these catalyst compounds should be used as homogeneous substances the composition of which is essentially in agreement with the above-mentioned formula and the properties of which, particularly the solubility are different from those of a mixture of the components which is equal in quantitative composition. In general the catalyst compounds are more difficultly soluble than the mixtures of initial components. The catalyst compounds are therefore easily prepared by combining the initial materials in the presence of water. The more difficultly soluble catalyst compounds then separate, after heating, if necessary. They may be recovered either by filtering and drying or by evaporating the solution to dryness. However, the catalyst compounds may also be prepared by melting a mixture of the initial materials, provided no decomposition takes place at the required melting temperature.

The preparation of compounds of the general formula $Alk(MeX_3)$ is described in the following literature references:

E. Rouyer: Comptes rendus, vol. 184, page 598 (1927); Comptes rendus, vol. 185, page 127 (1927); Annales de Chimie, Ser. 10, vol. 10, page 182 (1928); Annales de Chimie, Ser. 10, vol. 13, page 423 (1930).

H. Hering: Comptes rendus, vol. 194, page 1157 (1932); Annales de Chimie, Ser. 11, vol. 5, page 483 (1936).

H. Braune: Zeitschrift f. phys. Chemie, vol. 11, page 409 (1931).

H. Klug: Journal of the American Chemical Society, vol. 69, page 878 (1945).

E. Brandenberger: Experientia, vol. 3, page 149 (1947).

The catalysts in accordance with the invention may be used in all reactions in which carboxyl groups situated at aromatic ring systems, e.g., at benzene, naphthalene, anthracene, phenanthrene, diphenyl groups, etc. participated in an inter- or intramolecular exchange of position or are split off.

The catalysts in accordance with the invention may be used not only with salts of aromatic carboxylic acids, but also in the processing of salts of heterocyclic carboxylic acids, provided the heterocyclic ring system contains conjugated double bonds. These systems will preferably consist of 5- or 6-membered heterocyclenes, e.g., carboxylic acids of furan, thiophene, pyrrole, α-pyran, α-thiopyran and pyridine. The heterocyclic rings may be combined with other hetero rings or with aromatic rings, advantageously with benzene rings. Examples of such heterocyclenes are quinoline, isoquinoline, indene, benzotriazole, benzimidazole, etc.

The salts to be rearranged may be derived from monocarboxylic acids. In this case the principal reaction will be a rearrangement into dicarboxylic acid salt and ring system which is free of carboxyl groups. That is, some of the monocarboxylic acid molecules lose their carboxyl groups to others. When dicarboxylic acid salts are processed, the principal reaction is usually an intramolecular exchange in position of carboxyl groups, certain positions being preferred depending on the nature of the ring system. If salts of carboxylic acids containing three or more, e.g., 3–6, carboxyl groups per molecule are processed, the principal reaction usually consists in a decarboxylation with formation of dicarboxylic acid salts, although tri- and tetracarboxylic acids may also be formed. Should salts of polycarboxylic acids with three or more carboxyl groups to the molecule be processed in mixture with monocarboxylic acid salts, the carboxyl groups that are split off from the polycarboxylic acid migrate partly to the salts of monocarboxylic acids, so that the latter are converted into salts of polycarboxylic acids, especially into salts of dicarboxylic acids.

The carboxylic acid salts or mixtures of different carboxylic acid salts to be rearranged need not be used as such, but may be employed in the form of their structural components, especially as mixtures of free acids, their anhydrides, chlorides, amides, or imides with alkali carbonates.

It has been found that particularly good action is obtained when the constituents of the reaction mixture are intermixed as uniformly as possible. For this purpose the components of the reaction batch may be individually ground in ball mills, vibrating mills, rotating mills or other suitable apparatus, to form particles of the size of flour or dust, for example, and then carefully intermixed. However, the components of the reaction batch may first be mixed and then ground. In many cases it is advantageous to allow the mixture of initial materials to react in as compact a state as possible. For this purpose, the mixture may be compacted by pressure, sintering or other means.

In many cases manual compacting of the reaction batch in the reaction vessel will be adequate. A more thorough compacting is effected by compressing the mixture in hydraulic presses using pressures of 100–200 kg./sq. cm. In some instances materials which are compacted at pressures of up to 500 kg./sq. cm. are processed. However, it is generally not necessary to use pressures this high, because the reaction batch can be compacted by manual tamping or by compression with pressures of 100–200 kg./sq. cm. to a sufficient degree to largely eliminate the hollow, gas-filled spaces originally existing between the particles of the granular or powdered reaction batch. In the ideal case, there would be processed a mixture containing no hollow spaces or, in other words, a mixture, the specific gravity of which corresponded exactly with that calculated from the specific gravity of the components of the compact mixture.

Another possibility is to form an aqueous solution or slurry by combining the components of the reaction mixture, i.e., the carboxylic acid salts and their structural components, any diluent and, if desired, the catalyst in accordance with the invention. The aqueous solution is then converted into a dry product disregarding any possible precipitation, by the use of the usual apparatus, e.g., cylinder dryers, spray dryers, etc. The final dried material is a compact, coarse powder of high bulk density. The powder may be ground and/or compacted previous to the reaction.

The catalysts are advantageously added to the reaction batch at the time of its preparation, preferably before any comminution and compacting, so that the catalyst will be in as finely divided form and homogeneously distributed as possible in the reaction batch.

The remaining conditions for the reaction, such as temperature, pressure, etc., are conducted in the manner described in the earlier patents. The reaction mixture is heated to temperatures lying between 300° C. and the decomposition point of the carboxylic acid salts contained in the mixture, preferably at 350–550° C. The reaction may be carried out with the reaction mass at rest or in motion. As in the case of the earlier patents, the presence of inert gases, carbon dioxide, hydrogen, nitrogen, methane, ethane, propane, butane, etc., is advantageous. Moreover it is advisable to process the reaction batch in as anhydrous form as possible. The batch or its constituents are advantageously worked up in a well dried state, this being very important in the case of starting materials which contain water of crystallization or are hygroscopic.

The result of operating with the catalyst compounds in accordance with the invention is first an increase in yield, provided comparable conditions are employed, and also in the possibility of carrying out the rearrangement with good yields at lower pressures, or even without any pressure, i.e., under vacuum.

In carrying out the experiments described in the examples the initial materials were finely ground and well mixed. When the experiments were conducted under atmospheric pressure, the materials which had been dried at 100–120° C. were placed in open vessels of glass or metal which are sparged with inert gas from the time of the commencement of heating to the time of cooling. The mixture was heated to the given temperature and maintained at this temperature during the sparging. After cooling, the reaction product was ground, the soluble portions dissolved with hot water, and the insoluble portions filtered. The acid was precipitated from the filtrate by adding mineral acid (HCl or $H_2SO_4$), purified by washing with water and then dried. Any by-products, e.g., ring systems free of carboxyl groups, initial materials or other newly-formed carboxylic acids, which might be present in the reaction product or in the aqueous solutions were not separated.

To operate the process when manufacturing terephthalic acid, the reaction mixtures may be processed in accordance with the methods of U.S. applications Ser. No. 590,382, filed June 11, 1956; Ser. No. 590,371, filed June 11, 1956; Ser. No. 624,723, filed November 28, 1956; and Ser. No. 631,093, filed December 28, 1956. At the same time, the catalyst may be recovered. For this purpose I either first dissolve the reaction product in cold water and filter the undissolved portions, or I allow the catalyst which is partly dissolved in hot water to crystallize. The catalyst may be repeatedly reused. Should it show a drop in efficiency, it is advantageously regenerated, i.e., again recrystallized, or the catalytically effective metals are recovered from the catalyst by treatment with acids or alkalies and used to form a new catalyst.

The following examples are set forth to enable persons skilled in the art to practice my invention and are not intended to be limitative.

*Example 1*

To prepare the catalyst $K_2CdCl_2F_2$, molar quantities of $K_2F_2$ and $CdCl_2 \cdot H_2O$ are combined in the form of a 50% solution at the boiling point. The precipitate that forms on cooling is washed, dried and ground. The amount of precipitated product is 70% of theory. This yield can be improved by concentrating the mother liquor. According to analysis the product has the above empirical formula. In the following is described an example in which this substance was used as catalyst.

Charge: 242 g. dipotassium o-phthalate 14 g. of the above catalyst ground in a ball mill.

Reaction: 5 hours at 410° C. under $CO_2$ in open rolling autoclave.

Yield: 135 g. terephthalic acid (acid number=675).

*Example 2*

To prepare the catalyst $K_2CdF_4$, molar amounts of $CdF_2$ and $K_2F_2$ are mixed cold in the form of their aqueous solutions. The $K_2F_2$ solution is used in as concentrated form as possible, e.g., as a 10% solution, while the $CdF_2$ solution is more dilute, e.g., 3%. The resulting clear solution is heated and boiled for 10 minutes. During this time the product separates as a difficultly soluble compound. The precipitation product is suction-filtered, dried, finely ground and then dried at 150° C. to constant weight. According to analysis, its composition corresponds to the above formula. In the following is described an example in which this substance was used as catalyst.

Charge: 100 g. potassium benzoate, 43 g. $K_2CO_3$, 43 g. $K_2CdF_4$, ground in the ball mill.

Reaction: 6 hours at 410° C. under atmospheric pressure and $CO_2$.

Yield: 48 g. terephthalic acid (acid number=676).

*Example 3*

The $K_2CdCl_2F_2$ catalyst was produced as described in Example 1.

Charge: 107 g. potassium pyrazine-2,3-dicarboxylate, 66 g. $K_2CO_3$, 31 g. $K_2CdF_2Cl_2$.

Reaction: 3 hours at 320° C. at atmospheric pressure under $CO_2$.

Yield: 24 g. pyrazine-2,5-dicarboxylic acid (Acid Number 666, M.P.=253°C. (decomposition in a sealed tube)).

The acid is recovered in colorless form from the colored alkaline solution of the reaction product by boiling the solution with activated carbon.

*Example 4*

Catalyst produced as in Example 1.

Charge: 100 g. dipotassium o-phthalate, 6 g. $K_2CdF_2Cl_2$, ground in the ball mill.

Reaction: 5 hours at 400° C. under atmospheric pressure and $Co_2$.

Yield: 56 g. terephthalic acid.

*Example 5*

Catalyst produced as in Example 1.

Charge: 10 kg. dipotassium o-phthalate, 600 g. $K_2CdF_2Cl_2$.

Reaction: Heating in a continuous, pressureless apparatus at 390° C. Residence time 3 hrs.; hot $CO_2$ used as heating agent.

Yield: 4.8 kg. terephthalic acid.

*Example 6*

A mixture of 70 parts by weight potassium benzoate, 30 parts by weight potassium carbonate and varying amounts of $K_2CdF_2Cl_2$ are processed under the conditions described in Example 1. Without the use of a catalyst the yield of terephthalic acid amounts to 34% of theory. With the addition of enough catalyst to bring the cadmium content of the reaction mixture to 1%, the terephthalic acid content increases to 62% of theory. This yield can be further improved by increasing the amount of catalyst and, with the use of an amount of catalyst corresponding to a cadmium content of the reaction mixture of 2.5–12%, yields of more than 80%, occasionally even more than 90%, of theory are obtained.

*Example 7*

A reaction mixture of 70 parts by weight potassium benzoate and 30 parts by weight potassium carbonate is treated with enough $K_2CdF_2Cl_2$ to bring the cadmium content of the batch to 9% by weight. The reaction batch is processed at 400, 410 and 420° C. for varying heating times. At 400° C. and with times of not less than 7 hours, yields of more than 80% of theory are obtained; with prolonging of the reaction time to 11–24 hours the yield approaches 90% of theory. With temperatures of 410° C. the yields for a heating time of 3.5–9.5 hours are not less than 80% of theory and for a heating time of 5–8 hours, in the vicinity of 90% of theory. At 420° C. yields of 80% and more are obtained with heating times of 2.5–6 hours.

*Example 8*

In preparing $K_2CdF_2CO_3$ the procedure used is that of Example 2, except that the $K_2F_2$ solution is replaced by $K_2CO_3$ solution. The precipitate forms even in the cold solution and the catalyst is prepared, without boiling and by means of filtration, in an amount of 75% of theory. This yield may be increased by processing the mother liquor. The following materials:

200.0 g. potassium benzoate
    38.0 g. $K_2CdF_2CO_3$ catalyst
    86.0 g. potassium carbonate are finely ground and compressed by hand in a cylindrical iron vessel with the aid of an iron tamp. To render unhindered gas exchange possible, ten holes are punched into the pressed mass with a needle. The iron vessel is then heated for 9 hours at 410° C. in an electrical heating block which is well insulated on all sides, with passage over the surface of the vessel of carbon dioxide which has been preheated to the same temperature. After the reaction the ground and pressed material has shrunk and separated from the walls of the vessel. It weighs 280.0 g.=86.5% of the added amount. On processing the crude product in the usual manner, 104.0 g. terephthalic acid=82.0% of theory is obtained.

*Example 9*

Catalyst produced as in Example 1.

Charge:
    10.0 g. potassium benzoate
    1.7 g. potassium carbonate
    1.9 g. $K_2CdCl_2F_2$ catalyst The substances are well mixed in a ball mill and tamped in a test tube. The sample is heated for 6 hours at 400–410° C. in an aluminum block in an atmosphere of $CO_2$. After processing, a yield amounting to 3.7 g. terephthalic acid=71% of theory is obtained.

*Example 10*

3.28 kg. of a mixture of potassium benzoate, potassium carbonate and $K_2CdF_2Cl_2$ in a molar ratio of 10:2:1 were mixed in a ball mill and the milled mixture was introduced into a steel tube having a length of 70 cm. and an internal diameter of 10 cm. in the form of pressed briquets, the diameter of which corresponds to the internal diameter of the steel tube. One of the openings of the steel tube was closed and a condenser was connected to the other end. Thereafter, the tube was heated in an electric furnace in a carbon dioxide atmosphere for 8 hours at 440 to 445° C. internal temperature. The benzene formed thereby distilled off and was condensed in the cooler. After cooling, the tube was emptied and the raw reaction product which weighed 2.64 kg. was milled. Two samples of 150 g. each were worked up in the usual manner. 58.5 g. and 57.5 g., respectively, of terephthalic acid were obtained corresponding to a yield of 79.5 and 78.0% of theory, respectively.

While I have set forth specific embodiments and modes of practicing my invention, it will be understood that I do not intend to be limited thereby, and that various modifications may be made within the spirit of the invention and the scope of the appended claims.

I claim:

1. A process for the thermal rearrangement of alkali metal salts of aromatic carboxylic acids, said acids being selected from the group consisting of benzene, naphthalene, diphenyl, furan, thiophene, pyrrole, α-pyran, α-thiopyran and pyridine carboxylic acids, into corresponding salts of aromatic carboxylic acids having the carboxyl groups in a different relative position on the aromatic nucleus, wherein the rearrangement is conducted in the presence of salts of catalytically-active bivalent metals, wherein said metals are present in the form of compounds of the general formula selected from the group consisting of $Alk_2(MeX_2Y_2)$ and $Alk(MeX_3)$, in which Alk is an alkali metal cation, Me is a bivalent catalytically-active metal selected from the group consisting of cadmium, zinc and lead, X is a halogen ion and Y is an ion selected from the group consisting of halogen and carbonate ions.

2. The process of claim 1 wherein said alkali metal cation is selected from the group consisting of potassium and sodium ions.

3. A process for the thermal rearrangement of salts of aromatic carboxylic acids, said acids being selected from the group consisting of benzene, naphthalene, diphenyl, furan, thiophene, pyrrole, α-pyran, α-thiopyran and pyridine carboxylic acids, into corresponding salts of aromatic carboxylic acids having the carboxyl groups in a different relative position on the aromatic nucleus, wherein the rearrangement is conducted in the presence of salts of catalytically-active bivalent metals, wherein said metals are present in the form of compounds selected from the group consisting of compounds having the general formula $Alk_2(MeX_2Y_2)$ and $Alk(MeX_3)$, in which Alk is an alkali metal cation selected from the group consisting of cations of sodium and potassium, Me is a bivalent catalytically-active metal selected from the group consisting of cadmium, zinc and lead, X is a fluorine ion, and Y is an ion selected from the group consisting of halogen and carbonate ions.

4. A process for producing terephthalic acid by the thermal rearrangement of salts of benzene carboxylic acids other than terephthalic acid, wherein the rearrangement is conducted in the presence of salts of catalytically-active bivalent metals, wherein said metals are present in the form of compounds selected from the group consisting of compounds having the general formula $Alk_2(MeX_2Y_2)$ and $Alk(MeX_3)$, in which Alk is an alkali metal cation selected from the group consisting of cations of sodium and potassium, Me is a bivalent catalytically-active metal selected from the group consisting of cadmium, zinc and lead, X is a fluorine ion, and Y is an ion selected from the group consisting of halogen and carbonate ions wherein the product mixture is acidified to obtain the free terephthalic acid.

5. A process for producing aromatic carboxylic acids, said acids being selected from the group consisting of benzene, naphthalene, diphenyl, furan, thiophene, pyrrole, α-pyran, α-thiopyran and pyridine carboxylic acids, which comprises the steps of forming a mixture of a starting salt of an aromatic carboxylic acid having the carboxyl groups in a different relative position from the one to be produced and a salt of a catalytically-active bivalent metal selected from the group consisting of compounds having the general formula $$Alk_2(MeX_2Y_2) \text{ and } Alk(MeX_3)$$

in which Alk is an alkali metal cation, Me is a bivalent catalytically-active metal selected from the group consisting of cadmium, zinc and lead, X is a halogen ion and Y is an ion selected from the group consisting of halogen and carbonate ions, heating said mixture in a reaction vessel at atmospheric pressure under an atmosphere of an inert gas, and acidifying the resulting reaction mixture to obtain the free aromatic carboxylic acid.

6. The process of claim 5 wherein said alkali metal cation is selected from the group consisting of potassium and sodium ions.

7. A process for producing terephthalic acid which comprises the steps of forming a mixture of an alkali metal salt of a benzene dicarboxylic acid other than terephthalic acid and a salt of a catalytically-active bivalent metal selected from the group consisting of compounds having the general formula $$Alk_2(MeX_2Y_2) \text{ and } Alk(MeX_3)$$

in which Alk is an alkali metal cation, Me is a bivalent catalytically-active metal selected from the group consisting of cadmium, zinc and lead, X is a halogen ion and Y is an ion selected from the group consisting of halogen and carbonate ions, heating said mixture in a reaction vessel at atmospheric pressure under an atmosphere of an inert gas to produce the corresponding salt of terephthalic acid, acidifying the resulting reaction mixture to obtain free terephthalic acid.

8. A process for producing pyrazine-2,5-dicarboxylic-acid which comprises the steps of forming a mixture of potassium pyrazine-2,3-dicarboxylate and a salt of a catalytically-active bivalent metal selected fom the group consisting of compounds having the general formula $$Alk_2(MeX_2Y_2) \text{ and } Alk(MeX_3)$$

in which Alk is an alkali metal cation, Me is a bivalent catalytically-active metal selected from the group consisting of cadmium, zinc and lead, X is a halogen ion and Y is an ion selected from the group consisting of halogen and carbonate ions, heating said mixture in a reaction vessel at atmospheric pressure under an atmosphere of an inert gas to produce the potassium salt of pyrazine-2,5-dicarboxylate and acidifying the resulting reaction mixture to obtain free pyrazine-2,5-dicarboxylic acid.

9. A process for producing terephthalic acid which comprises the steps of forming a mixture of potassium benzoate and a salt of a catalytically-active bivalent metal selected from the group consisting of compounds having the general formula $$Alk_2(MeX_2Y_2) \text{ and } Alk(MeX_3)$$

in which Alk is an alkali metal cation, Me is a bivalent catalytically-active metal selected from the group consisting of cadmium, zinc and lead, X is a halogen ion and Y is an ion selected from the group consisting of halogen and carbonate ions, heating said mixture in a reaction vessel at atmospheric pressure under an atmosphere of an inert gas to produce the corresponding salt of terephthalic acid, and acidifying the resulting reaction mixture to obtain free terephthalic acid.

References Cited in the file of this patent

FOREIGN PATENTS 202,893    Australia _____ Dec. 30, 1954